United States Patent
McCreight et al.

(10) Patent No.: US 7,809,686 B2
(45) Date of Patent: Oct. 5, 2010

(54) ELECTRONIC DISCOVERY SYSTEM AND METHOD

(75) Inventors: Shawn McCreight, Pasadena, CA (US); Jon Stewart, Los Angeles, CA (US); Brent Botta, Dublin, CA (US)

(73) Assignee: Guidance Software, Inc., Pasadena, CA (US)

( * ) Notice: Subject to any disclaimer, the term of this patent is extended or adjusted under 35 U.S.C. 154(b) by 0 days.

(21) Appl. No.: 11/544,534

(22) Filed: Oct. 6, 2006

(65) Prior Publication Data
US 2007/0112783 A1 May 17, 2007

Related U.S. Application Data

(60) Provisional application No. 60/724,623, filed on Oct. 6, 2005.

(51) Int. Cl.
*G06F 7/00* (2006.01)
(52) U.S. Cl. .......................... 707/653; 707/825; 707/647
(58) Field of Classification Search ................. 707/204, 707/653
See application file for complete search history.

(56) References Cited

U.S. PATENT DOCUMENTS

| | | | |
|---|---|---|---|
| 5,475,625 A | 12/1995 | Glaschick | |
| 5,491,750 A | 2/1996 | Bellare et al. | |
| 5,819,273 A | 10/1998 | Vora et al. | |
| 5,928,323 A | 7/1999 | Gosling et al. | |
| 5,944,791 A | 8/1999 | Scherpbier | |
| 5,944,794 A | 8/1999 | Okamoto et al. | |
| 6,012,098 A | 1/2000 | Bayeh et al. | |
| 6,084,969 A | 7/2000 | Wright et al. | |
| 6,377,589 B1 | 4/2002 | Knight et al. | |
| 6,601,061 B1 | 7/2003 | Holt et al. | |
| 6,647,400 B1 * | 11/2003 | Moran ........................ 707/205 |
| 6,792,545 B2 | 9/2004 | McCreight et al. | |
| 6,874,088 B1 | 3/2005 | Stevens | |
| 6,889,168 B2 | 5/2005 | Hartley et al. | |
| 6,944,760 B2 | 9/2005 | Wills | |

(Continued)

OTHER PUBLICATIONS

Co-pending U.S. Appl. No. 11/315,761, filed Dec. 21, 2005, entitled: System and Method for Searching for Static Data in a Computer Investigation System, 29 pages plus 10 figures.

(Continued)

*Primary Examiner*—Apu M Mofiz
*Assistant Examiner*—Ajith Jacob
(74) *Attorney, Agent, or Firm*—Christie, Parker & Hale, LLP

(57) ABSTRACT

A computer investigation system and method that conducts electronic discovery of desired files across a live network in a forensically sound manner. The investigation entails an examining machine electronically identifying, collecting, and preserving evidence from target machines that is responsive to a set of investigation criteria. The set of investigation criteria is associated with an investigation subject that is identified by a global unique identifier (GUID). As the investigation subject is applied to the various files, the responsive files are stamped with the GUID and preserved in a container file referred to as a logical evidence file (LEF). The GUID allows the results of an investigation to be easily and reliably traced to the particular investigation subject that was applied.

28 Claims, 15 Drawing Sheets

U.S. PATENT DOCUMENTS

| | | | |
|---|---|---|---|
| 7,096,503 | B1 | 8/2006 | Magdych et al. |
| 7,146,642 | B1 | 12/2006 | Magdych et al. |
| 7,370,072 | B2 | 5/2008 | Jessen |
| 2001/0011349 | A1 | 8/2001 | Garrison |
| 2002/0178162 | A1 | 11/2002 | Ulrich et al. |
| 2003/0014669 | A1 | 1/2003 | Caceres et al. |
| 2003/0172306 | A1 | 9/2003 | Cain et al. |
| 2003/0195984 | A1 | 10/2003 | Zisapel et al. |
| 2003/0196123 | A1 | 10/2003 | Rowland et al. |
| 2003/0208689 | A1 | 11/2003 | Garza |
| 2004/0006588 | A1 | 1/2004 | Jessen |
| 2004/0073534 | A1* | 4/2004 | Robson .................. 707/1 |
| 2004/0098359 | A1 | 5/2004 | Bayliss et al. |
| 2004/0122908 | A1 | 6/2004 | Konopka et al. |
| 2004/0260733 | A1* | 12/2004 | Adelstein et al. ............ 707/202 |
| 2005/0097366 | A1 | 5/2005 | McCreight et al. |
| 2005/0268334 | A1 | 12/2005 | Hesselink et al. |
| 2006/0101009 | A1 | 5/2006 | Weber et al. |
| 2007/0011450 | A1 | 1/2007 | McCreight et al. |
| 2008/0082672 | A1 | 4/2008 | Garrett |

OTHER PUBLICATIONS

Civie, V. et al. Future Technologies from Trends in Computer Forensic Science, IEEE Sep. 1998, Sections II and V, pp. 105-108.

Abraham, T., et al., *Investigative Profiling with Computer Forensick Log Data and Association Rules*, IEEE 2002, pp. 11-18.

Civie, V., et al., *Future Technologies From Trends in Computer Forensic Science*, Sections II and V, IEEE Sep. 1998, , pp. 105-108.

International Search Report and Written Opinion for PCT/US06/39527, dated Jul. 7, 2008, 8 pgs.

International Search Report and Written Opinion for PCT/US05/46421, dated Jul. 21, 2008, 11 pgs.

*Honeypot Forensics Part 1: Analyzing the Network*, The Honeynet Files, IEEE Computer Society, IEEE Security & Privacy, Jul./Aug. 2004, pp. 72-78.

International Search Report and Written Opinion for PCT/US 07/79870, dated Sep. 15, 2008, 8 pgs.

Supplemental European Search Report, dated Sep. 22, 2008, for Application No. EP 03734478.5, in the name of Guidance Software, Inc., 3pgs.

* cited by examiner

```
           Name:           People.doc
           File Ext: doc
           File Type:      Word Document
           File Category:  Document
           Description:    File, Archive
           Last Accessed:  02/19/05 08:35:55PM
  504      File Created:   02/19/05 08:35:55PM
           Last Written:   11.08.04 10:19:24AM
           Entry Modified: 04.27.05 11:08:46AM
           File Acquired:  04/29/05 08:08:02AM
           Logical Size:   25,088
           Physical Size:  25,088
           Starting Extent: 0Bair Notebook-C1022,1791
           File Extents:   1
           Permissions:    •
           Physical Location:    4,187,903
           Physical Sector: 1,022
           Evidence File:  Bair Notebook
  506      Hash Value:     21d3e80b71f4c09f314356a9ea3b612a
  508      Full Path:      FIM\Bair Notebook\Bair MS Word\GSI Data\Biz Dev\AD\People.doc
           File Extents
           Start Byte   Bytes   Start Sector   Sectors   Start Cluster   Clusters
           4,187,903   25,088   1,022    7      1,022    7

Permissions
           Name:    Administrators
  510      Id:      S-1-5-32-544
           Property:     Allow
           Permissions:  [FC] [M] [R&X] [R] [W] [Sync]

Id:      S-1-5-18
           Property:     Allow
           Permissions:  [FC] [M] [R&X] [R] [W] [Sync]

Subject
  516      Name:    test
           Evidence Number:     C
           Total Bytes:    39,999,503,872
  512      GUID:    1d4fefb78496c64a8e1cc6642a9522fe
  514      Acquired:      04/29/05 08:08:02AM
```

FIG. 9

ELECTRONIC DISCOVERY SYSTEM AND METHOD

CROSS-REFERENCE TO RELATED APPLICATION(S)

This application claims the benefit of U.S. Provisional Application No. 60/724,623, filed on Oct. 6, 2005, the content of which is incorporated herein by reference.

This application also contains subject matter that is related to the subject matter in U.S. Pat. No. 6,792,545, and the subject matter in U.S. patent application Ser. No. 11/315,761, filed on Dec. 21, 2005 the content of both of which are incorporated herein by reference.

FIELD OF THE INVENTION

This invention relates generally to computer investigation systems, and more specifically, to a system and method for conducting investigations of computer devices in a forensically defensible manner.

BACKGROUND OF THE INVENTION

U.S. Pat. No. 6,792,545, assigned to the Assignee of the present application, discloses a system and method for performing secure investigations of networked devices over a computer network. This patent discloses that investigations of computer media may be conducted by obtaining raw sectors of the computer media and making full bit copies of such media. However, it may be desirable to obtain and preserve only particular files from the computer media, and to do so in a forensically sound manner.

SUMMARY OF THE INVENTION

The present invention is directed to a system and method for conducting investigations of one or more target machines in a data communications network via an examining machine. The examining machine defines a set of investigation criteria and automatically generates a unique identifier for the set of investigation criteria. The examining machine then automatically investigates the one or more target machines based on the set of investigation criteria and outputs results of the investigation. The results of the investigation are preserved in an evidence data store. The unique identifier is also stored in the evidence data store in association with the preserved evidence data, allowing the evidence data to be traced to the investigation subject.

According to one embodiment of the invention, the evidence data store is a container file storing metadata of files that are responsive to the investigation criteria and copies of the responsive files.

According to one embodiment of the invention, the unique identifier is randomly generated by the examining machine.

According to one embodiment of the invention, the investigation criteria includes one or more filter conditions for identifying one or more files based on the filter conditions. The filter conditions may specify file metadata. The examining computer retrieves filesystem data of the one or more target machines, compares the filesystem data with the specified file metadata, and identifies the one or more files based on the comparison.

According to one embodiment of the invention, the investigation criteria includes one or more keywords for identifying files in the one or more target machines containing the one or more keywords.

According to one embodiment of the invention, the investigation criteria identifies a specific source file for identifying a file in the one or more target machines matching the source file. In order to find a machine file, the examining machine identifies lengths of the source file and a file in a particular target machine that is being considered for a match and determines whether the lengths are equal. If the lengths are equal, the target machine is invoked to compute a digital signature value of the file being considered for a match. The digital signature values of the source file and the file being considered for a match are retrieved, and a determination is made as to whether the digital signature values are equal. If the digital signature values are equal, the file being considered for a match is identified as a matching file.

According to one embodiment of the invention, a post-processing module receives an examiner report including the unique identifier for the set of investigation criteria used for the investigating. The module compares the unique identifier in the examiner report with the unique identifier in the evidence data store. A verification message is then output based on the comparison.

According to one embodiment of the invention, the unique identifier is retrieved from the evidence data store, and the set of investigation criteria is reconstructed based on the unique identifier.

These and other features, aspects and advantages of the present invention will be more fully understood when considered with respect to the following detailed description, appended claims, and accompanying drawings. Of course, the actual scope of the invention is defined by the appended claims.

BRIEF DESCRIPTION OF THE DRAWINGS

FIG. 9 is a layout diagram of metadata preserved in a logical evidence file according to one embodiment of the invention;

DETAILED DESCRIPTION

Figure 1:
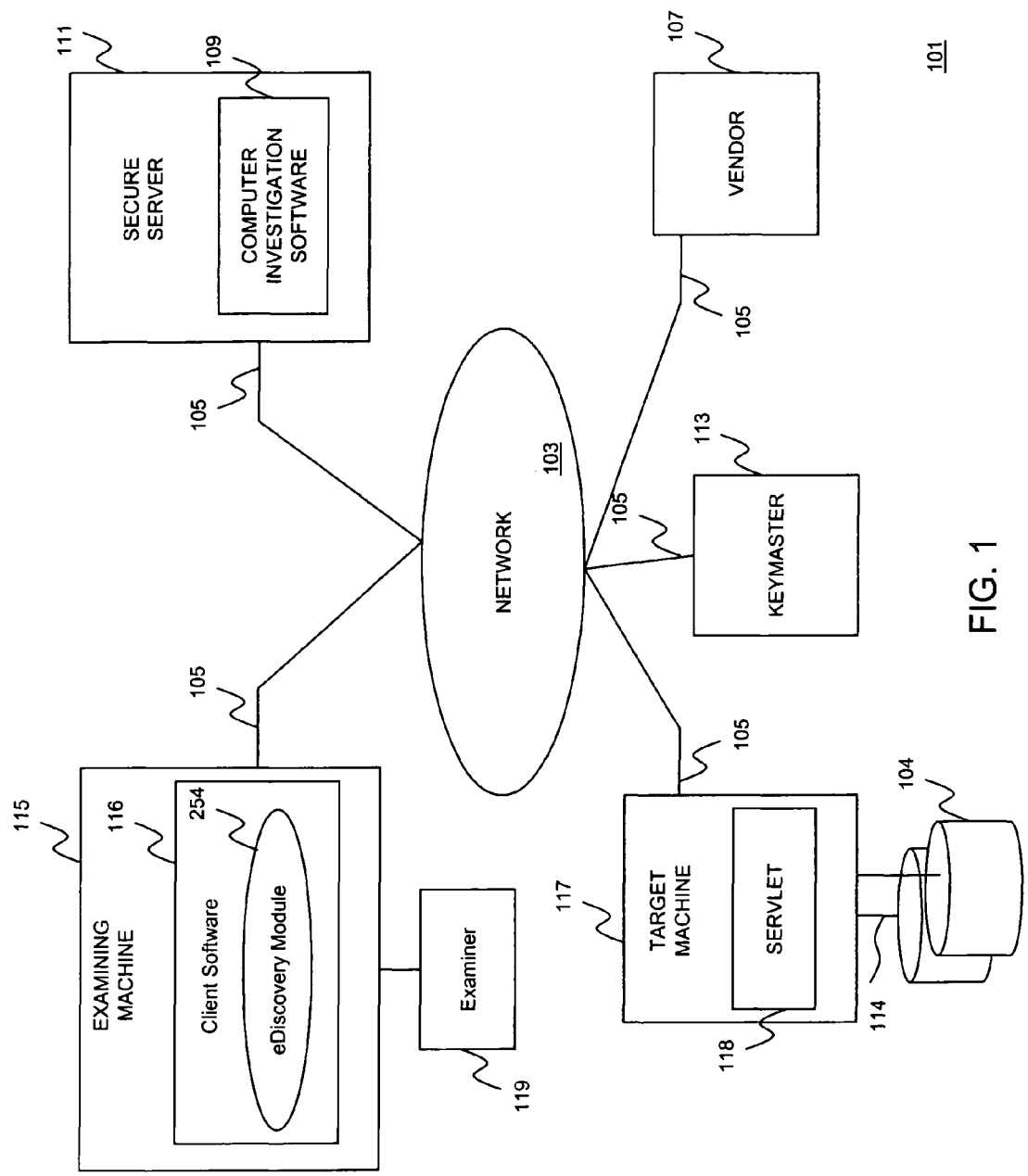
FIG. 1 is a block diagram of an exemplary computer investigation system according to one embodiment of the invention.

The desirability of obtaining and preserving only particular files from a computer media, and doing so in a forensically sound manner should be evident when considering the following scenario.

Assume that an employee of a large company has illicitly contaminated his assigned computer workstation with documents containing intellectual property (IP) from his former employer. It is unknown whether the employee distributed the IP to any other employees, and, if so, to what extent.

The former employer raises the issue with the company and a large investigation is performed in order for the large company to avoid a costly lawsuit and/or criminal charges. Alternatively, the former employer sues the employee and/or company, and the investigation is required to comply with a discovery order. In either scenario, the investigation may require thousands of computer workstations to be searched, and any potentially responsive documents to the search to be collected and preserved in a forensically sound manner.

Although the workstations are part of a controlled network, they are distributed globally, and access control permissions allow users to save documents on storage media directly attached to the workstations (e.g. internal hard drives). There is no centralized, global index of all documents across all computers. What information exists on these workstations is largely unknown. The maximum amount of storage on the workstations may average 40 GB or more, and each one may contain upwards of 100,000 files. The vast scale of the investigation often conflicts with the tight deadlines demanded by the competitor's counsel and the prevailing law enforcement officials.

Accordingly, it is desirable for a computer investigation system and method that conducts electronic discovery of desired files across a live network, in an efficient and legally defensible manner.

In general terms, embodiments of the present invention are directed to such a computer investigation system. The investigation may be conducted in response to an electronic discovery order issued by a court, or as part of a routine or non-routine investigation conducted by an organization.

The investigation according to one embodiment of the invention entails electronically identifying, collecting, and preserving evidence that is responsive to a set of investigation criteria. In order to be legally defensible, it is desirable for the investigation criteria to be reasonable, testable, and consistently applied across identified target machines.

To help achieve this, the computer investigation system and method according to the described embodiments allow a complicated set of investigation criteria to be defined in an organized and structured manner. The set of investigation criteria is then associated with an investigation subject that is identified by a subject name and a global unique identifier (GUID). As the investigation subject is applied to the various files, the responsive files are stamped with the GUID and preserved in a container file referred to as a logical evidence file (LEF). Alternatively, the container file is stamped with the GUID, allowing an automatic association between the GUID and each file preserved in the LEF. In this manner, the responsive files may be permanently associated with the GUID, allowing the results of the investigation to be easily and reliably traced to the particular investigation subject that was applied. The tight coupling of the investigation subject to the investigation criteria and to the evidence files help ensure a legally defensible and forensically sound investigation.

FIG. 1 is a block diagram of an exemplary computer investigation system 101 according to one embodiment of the invention. The computer investigation system 101 includes various network devices coupled to a data communications network 103 over data communication links 105. The data communications network 103 may be a computer network, such as, for example, a public Internet, a private wide area network (WAN), a local area network (LAN), or other wired or wireless network environment conventional in the art. The network devices may include a vendor computer 107, a secure server 111, an examining machine 115, one or more target machines 117, and a keymaster computer 113. The data communication link 105 may be any network link conventional in the art, such as, for example, an Ethernet coupling.

A vendor having access to the vendor computer 107 provides the organization with a computer investigation software 109 which enables the organization to effectively perform forensic investigations, respond to network safety alerts, and conduct network audits over the data communications network 103. The computer investigation software 109 may also allow other investigations of networked devices in addition to forensic investigations as evident to those of skill in the art.

The investigation software is installed in a local memory of the secure server 111 allocated to the organization. According to one embodiment of the invention, the computer investigation software 109 provides computer program instructions which, when executed by one or more processors resident in the secure server 111, cause the secure server to broker safe communication between the examining machine 115 and the target machines 117. The computer investigation software further facilitates the administration of users, logs transactions conducted via the server, and controls access rights to the system.

The examining machine 115 (which may also be referred to as the client) allows an authorized examiner 119 to conduct searches of the target machines 117 and their associated secondary storage devices 104. In this regard, the examining machine 115 includes a client software 116 which includes the functionality and interoperability for remotely accessing the secure server 111 and corresponding target machines 117. The client software 116 may be implemented as computer program instructions stored in memory and executed by one or more processors resident in the examining machine 115.

According to one embodiment of the invention, the client software 116 includes an electronic discovery (eDiscovery) module 254 and associated graphics user interface (GUI). The eDiscovery module 254 is accessed by an examiner for defining a set of investigation criteria and initiating investigation of the target machines 117.

Each target machine 117 is exemplarily the subject of a computer investigation conducted by the examining machine 115. Each target machine 117 is coupled to one or more secondary storage devices 104 over an input/output connection 114. The storage devices include any nonvolatile storage media such as, for example, hard disks, diskettes, Zip drives, redundant array of independent disks (RAID) systems, holographic storage devices, and the like.

According to one embodiment, a servlet 118 installed on a particular target machine 117 responds to commands provided by the examining machine 115 to remotely discover, preview, and acquire dynamic and/or static data, and transmit the acquired data to the examining machine via the secure communication path created between the target machine and the examining machine. The servlet may be implemented as any software module stored in memory that is executed by one or more processors resident in the target machine 117, and is not limited to applets in a web browser environment.

The computer investigation system 101 illustrated in FIG. 1 further includes an examiner device which allows the examiner direct or remote access to the examining machine 115 in any manner conventional in the art. The examiner device 119 may be an input and/or output device coupled to the examining machine 115, such as, for example, a keyboard and/or monitor. The examiner device 119 may alternatively be a personal computer or laptop communicating with the examining device over a wired or wireless communication mechanism.

According to one embodiment of the invention, the examiner is a trusted individual who safely stores in the examining machine 115, one or more encryption keys used for authenticating to the secure server 111 and conducting the secure investigation of the target machines 117, as is described in more detail in the above-referenced U.S. Pat. No. 6,792,545.

Figure 2A:
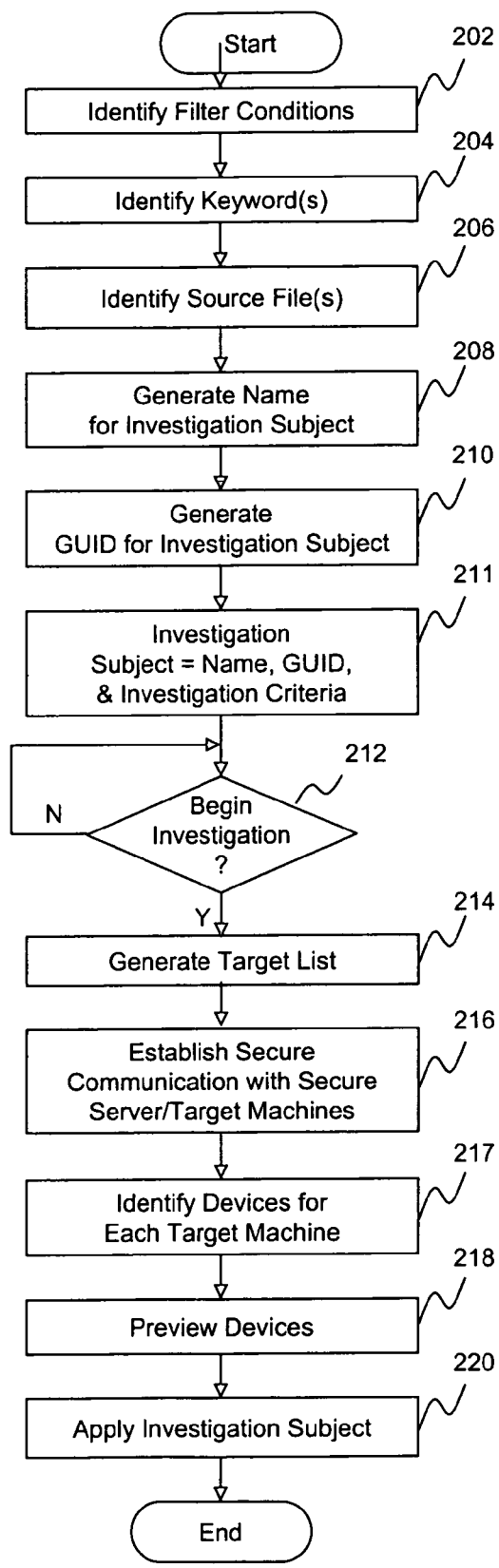
FIGS. 2A-2B are flow diagrams of a process executed by an eDiscovery module for conducting an investigation of one or more target machines according to one embodiment of the invention.
Figure 2B:
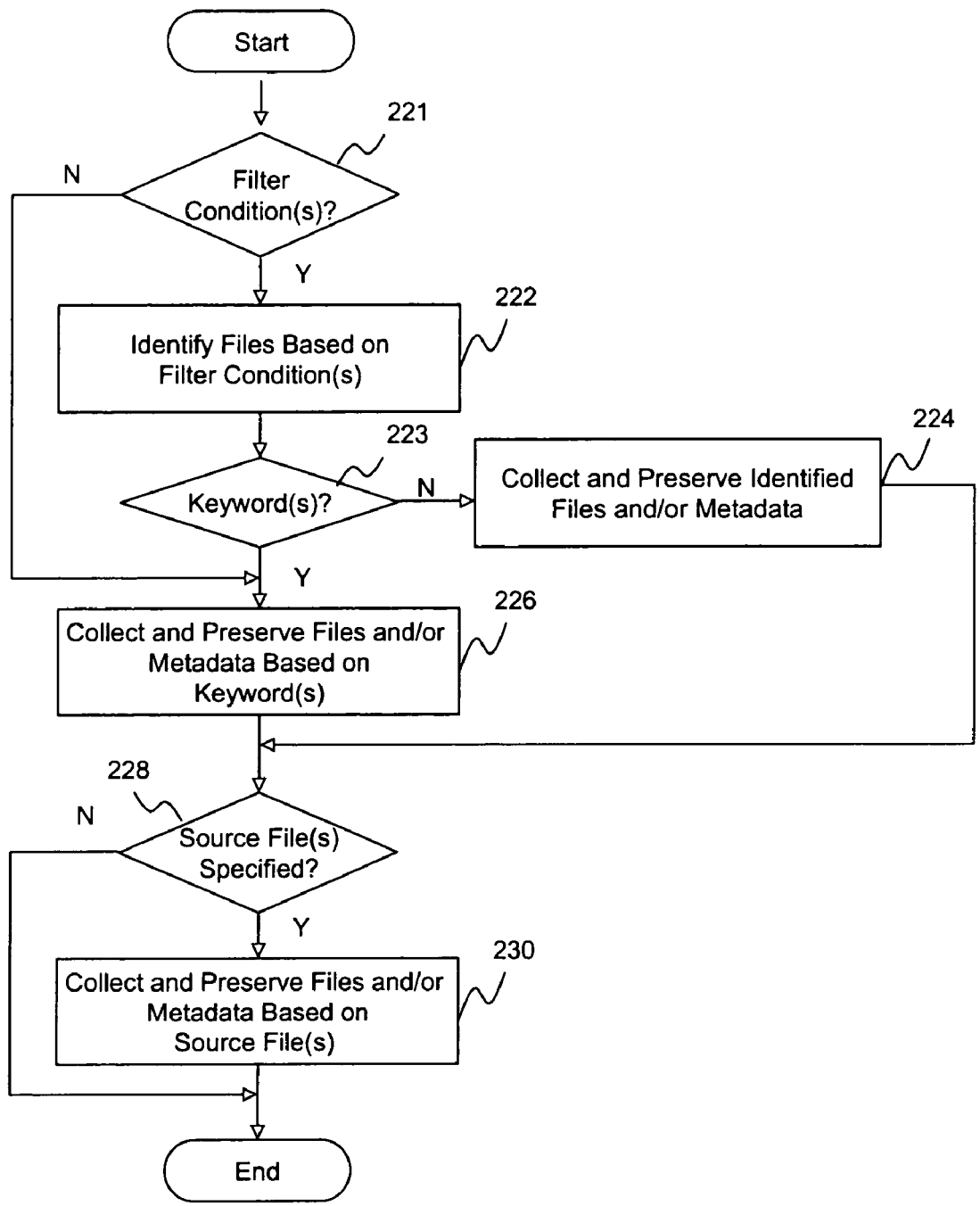

FIGS. 2A-2B are flow diagrams of a process executed by the eDiscovery module 254 for conducting an investigation of one or more target machines according to one embodiment of the invention. The process may be executed in the order indicated in the flow diagram, or in any other order appreciated by a person of skill in the art.

In step 202, the eDiscovery module identifies one or more filter conditions for the investigation based on input provided by the examiner. The filter conditions may be based on file metadata fields that are typically maintained by a computer filesystem. For example, the metadata fields may specify, for a particular file, a name, file directory structure, various timestamps (e.g. created, accessed, modified, and written timestamps), user access permissions, and the like.

Filtering by common filesystem metadata fields allows a quick and efficient reduction of the number of documents that need to be considered. For example, the filter conditions may be set to exclude certain directories from the search, or specify particular folders or directories to limit the collection of files to the designated folders or directories.

The filter conditions may also be set based on different file extensions. Exemplary file extensions include a .doc, .xls, .pps, .ppt. or .mdb extension for Microsoft Office files, a .pst or .nsf extension for e-mail archives, and .wav, .jpg, or .avi extension for respectively audio, graphic, or video file.

The file extensions included in the filter conditions may be set as inclusive or exclusive extensions. An "inclusive extension" targets any file that has an extension in the approved set list. An "exclusive extension" targets all data except for files in the extension list. The exclusive method may be used to filter out standard program files with no investigative value.

The filter conditions may further be set to specify particular ranges of dates and/or times to search in the file timestamp data. For example, documents that have not changed since the start date of an employee in question may be excluded.

Other filter conditions may be set to indicate particular file names, active or deleted file status, security properties, and the like. According to one embodiment of the invention, the various filter conditions may be combined to form complex boolean expressions via the GUI provided by the eDiscovery module 254.

In step 204, the eDiscovery module identifies one or more keywords for the investigation based on input provided by the examiner. Such keywords help narrow the scope of the data collection by causing examination of the content of potentially responsive files for the existence of the keywords before such files are collected. Various options may be set along with the keywords, such as, for example, a case sensitive search option, language option, and the like.

In step 206, the eDiscovery module identifies one or more source files based on input provided by the examiner. This is useful when the investigation entails the search of the one or more source files, and the examiner has electronic copies of the source files to find an exact match.

A person of skill in the art should recognize that the set of investigation criteria identified by the eDiscovery module 254 may include any combination of filter conditions, keywords, and/or source files specified in steps 202-206. Thus, not all three criteria need to be present in order to define an investigation subject. Similarly, the three types of criteria may be combined in any manner to create as complicated of a set of investigation criteria as desired for a particular investigation.

According to one embodiment of the invention, the eDiscovery module 254 allows the defined investigation criteria to be grouped together and organized under an investigation subject, simplifying the organization, access, and application of the investigation criteria. In this regard, in step 208, the eDiscovery module 254 generates a name for the investigation subject. The name is selected by the examiner and may be descriptive of the subject matter of the investigation.

In step 210, the eDiscovery module 254 generates a GUID for the investigation subject. According to one embodiment of the invention, the GUID is a number randomly generated by the eDiscovery module.

In step 211, the eDiscovery module 254 associates the name, GUID, and the identified set of investigation criteria to the investigation subject, and stores it in the memory.

According to one embodiment of the invention, a GUID is regenerated if any of the investigation criteria options are changed. Thus, according to one embodiment of the invention, the GUID is not mathematically related to the investigation criteria. Therefore, the GUID-Subject relationship tracks identity rather than equality. No two subjects are designed to have the same GUID, even if they happen to have the same settings. Thus the GUID provides a mechanism for tracking the creation and application of the investigation subject to the set of universe of files that need to be considered.

Once the investigation subject has been defined, it may be selected to conduct an investigation. In this regard, the eDiscovery module 254 determines, in step 212, whether an investigation is to be conducted. In this regard, the eDiscovery module 254 determines whether a particular investigation subject has been selected and a command was provided to initiate the investigation.

If the answer is YES, the eDiscovery module 254 generates, in step 214, a target list of the target machines 117 that are to be scanned for the investigation. The target list may be a list of network addresses, machine names, and/or address ranges provided by the examiner.

In step 216, the eDiscovery module 256 establishes a secure communication with the secure server 111 which then brokers safe communication between the examining machine 115 and the target machines in the target list as is described in further detail below with respect to FIGS. 11A-11B. According to one embodiment of the invention, the secure server 111 allows the examining machine 115 to be concurrently connected with a plurality of the identified target machines.

According to one embodiment of the invention, if a machine name is used to connect to a particular target machine, the eDiscovery module 256 verifies, upon connection, that the machine name that was used matches the actual name that is stored in the target machine. If the machine name values do not match, the target machine is not scanned as it is not in the target list.

In addition, in order to keep track of the status of the machines that have been scanned during the investigation, the examining machine 115 maintains a database with information on the target machines that have been scanned and information related to the devices associated with each target machine. After each device of a target machine is scanned, it is marked as complete in the database. Once all the devices in the target machine have been scanned, then the machine itself is marked as complete in the database.

In step 218, the eDiscovery module 256 applies the investigation subject to the files in the verified target machines. If the application of the investigation subject results in a file being identified as being responsive, it copied back to the examining machine.

Performing a collection of a single target computer may take several hours, due to the target computer's own processing characteristics (e.g. processor speed, amount of random access memory), the bandwidth and latency characteristics of the network connection 105, and the amount of data that is identified as responsive. On large collections, it is desirable to process several target computers simultaneously. However, each target computer should preferably be scanned only once, and only one connection should be made to the target system at any given time. Additionally, for very large collections, the amount of work done by the eDiscovery module 254 and the client software 116, and the amount of data sent over the network 105 to the examiner computer 115 may exceed the computational resources of a single examiner computer 115.

According to one embodiment of the invention, in order to scale to large collections, the eDiscovery module 254 is configured to be run in parallel, on several examiner machines 115, against the set of target machines 117. To coordinate the activity of the parallel instances of the eDiscovery module 254, a simple database, such as the one mentioned above for keeping status information, is used to maintain information about the target machines. Each parallel instance is configured to connect to every target machine. When the connection is made, the instance queries the simple database for any information related to the target machine. One of the fields associated with the target machine information denotes whether the target is currently being processed by an eDiscovery module instance.

If this fields signifies that the current target machine is not being processed, then the connected eDiscovery module instance proceeds to update this field in the database so that it has exclusive access. However, consider that another instance of the eDiscovery module could also be doing exactly the same thing. Without some level of concurrency control, both instances could mark the machine as being in progress and both would then begin scanning the machine. This is obviously inefficient.

While many database systems have functionality for ensuring that updates such as this occur atomically, such that an update from one eDiscovery module instance would succeed and the other fail, not all do, especially mass-market consumer databases (e.g. Microsoft Access). The eDiscovery module does not use the database heavily, so it is desirable for the module to work with as many databases as possible. Even if a particular database system does not allow for atomic transactions, almost all provide for a data field known as an "auto-increment" value. If such a field exists in the database, then each new record that is created in the database is assigned a new number by the database for this field, and the value is guaranteed, according to one embodiment, to be unique to the database. Typically the values are integer numbers which increase by one value (e.g. "1, 2, 3, 4 . . . ") with each new record. It is a property of the database that this value is updated atomically, such that no two records will ever have the same value.

Therefore the eDiscovery module takes advantage of this limited atomic property of the database to synchronize access to target machines. When the eDiscovery module instance 254 connects to the machine and determines that the target 115 is not currently being scanned, it generates a temporary globally unique identifier (GUID) and then creates a new record in the database containing the GUID and examining machine name. This record is automatically assigned an auto-increment value by the database. The eDiscovery module 254 then issues a new query to the database to retrieve any records related to that particular machine name. If any other instances of the eDiscovery module are trying to gain access to the target at the same time, they will have performed the same operation, and therefore multiple records will have been created by the eDiscovery instances. The instance then examines each record returned. According to one embodiment, only if its own GUID matches the record with the lowest auto-increment value does the eDiscovery module instance go forward with processing the target machine (and in so doing, updating the machine information in the database related to marking the machine as being in progress). If an eDiscovery module instance determines that the record with its GUID was not the first record related to the target machine, then it does try to process that particular target machine and continues its attempt to process other target machines. In this manner, the eDiscovery Suite module is able to synchronize access to target machines while utilizing almost any database system, even ones with degraded transactional abilities.

According to one embodiment, given that the multiple instances of the eDiscovery module 254 may be scanning the set of target machines 115, consideration is be given to the distribution of the target machines on the network 105 in order to maximize the throughput of the entire collection. Some target machines may exist on a segment of the network 105 with restricted bandwidth such that all targets on the segment may not be able to be scanned simultaneously without creating a network bottleneck. In practice this is quite common with collections at large organizations which have many network segments distributed geographically across the world.

Accordingly, the set of target machines is often provided to the eDiscovery module in non-random order. It is very common for the list to be ordered by organizational department, which has a high degree of correlation to geographic and network distribution, or explicitly by geographic location. If multiple instances of the eDiscovery module are used, then each would proceed through the list in order and many machines on the same network segment would be processed simultaneously, thus straining network traffic on particular segments. As network traffic becomes constrained, the total collection is delayed.

To avoid this situation, information concerning the network distribution of the target machines could be provided as input to the eDiscovery module and that information could be taken into consideration as the eDiscovery module instances connected to the targets. However, counsel is typically unaware of how the network is segmented and the capabilities of each segment. Additionally, the network and the distribution of the target machines on it is often highly dynamic (e.g. custodians with laptops may change their location on the network frequently). Gathering this information and keeping it updated is burdensome.

Therefore, according to one embodiment of the invention, a much simpler strategy is utilized by the eDiscovery module to avoid the aforementioned situation, where network traffic becomes a bottleneck on a particular segment. When each eDiscovery module instance is provided with the list of target machines, it randomly permutes the ordering of the machines internally to itself and then connects to the machines according to the new permutation. According to one embodiment, the permutation is not retained. Each eDiscovery module instance will likely create a unique permutation. Therefore in the aggregate, network utilization will be fairly distributed across the global network 105 avoiding bottlenecks on particular segments. Additionally, if any one network segment is degraded or becomes unavailable, scanning of target machines on other network segments is unaffected. In this way the aggregate collection proceeds in a robust manner and throughput it maximized.

FIG. 2B is a more detailed flow diagram of step 220 of FIG. 2A of applying the investigation subject according to one embodiment of the invention.

In step 221, the eDiscovery module 256 determines whether the selected investigation subject includes one or more filter conditions. If the answer is YES, the eDiscovery module 256 identifies, in step 222, the files that satisfy the filter conditions. In this regard, the eDiscovery module obtains from each of the identified target machines a copy of their full filesystem metadata and compares the filter conditions against the obtained metadata.

In step 223, the eDiscovery module 256 determines whether the selected investigation subject includes any search keywords. If the answer is NO, the metadata of the files identified in step 222 is collected and preserved in an evidence file associated with the investigation subject along with the investigation GUID. If the content of the identified files is to also be collected, acquisition commands are transmitted to the corresponding servlets for acquiring the indicated files. Each acquired file is stamped with the GUID by associating the GUID to the acquired file. The files may be acquired, for example, in the manner described in the above-referenced U.S. patent application Ser. No. 11/315,761. The acquired files are then stored in the evidence file associated with the investigation subject.

If the investigation subject does, however, specify a keyword set, the eDiscovery module 254 transmits commands to one or more servlets associated with the files identified in step 222, for collecting and preserving from the identified files, the files and/or their metadata that also contain the set of keywords. According to one embodiment of the invention, a multiple number of the identified servlets may be concurrently invoked for performing searches of the identified files for the specified keyword set.

According to one embodiment of the invention, the servlet conducts a non-indexed search of the specified files. The search makes use of optimized algorithms for determining responsiveness to the keywords during a single pass through the files. At the end of this pass, information about search hits is retained and returned to the eDiscovery module 254. According to one embodiment of the invention, the servlet returns for each hit, a file offset, in bytes, that denotes the start of the hit, the length of the hit in bytes, and the keyword that generated the hit. The returned data may then be used to acquire a copy of the corresponding file.

The eDiscovery module 254 collects the metadata of the files that have resulted in a hit in the evidence file associated with the investigation subject along with the investigation GUID. The examining machine then transmits a command to acquire the content of such files such content is to be preserved. The acquired files are stamped with the GUID and stored in the evidence file associated with the investigation subject.

In step 228, the eDiscovery module 254 determines whether the investigation subject includes a source file to be searched for a match. If the answer is YES, the eDiscovery module proceeds to collect and preserve, in step 230, the files matching the source file and/or their metadata. In this regard, the eDiscovery module 254 compares the size of the source file against the size of the files to be investigated. The file size information is maintained by the filesystem obtained from the target devices. If the size of a given file does not match the file size of the source file, then a determination is made that the files are different.

Otherwise, if there is a match of the file sizes, the digital signatures, such as, for example, hash values, of the source file and the candidate file are generated for determining a match. In this regard, the eDiscovery module 254 commands the servlet associated with the candidate file to compute a hash value of the candidate file. If a hash value of the source file has not yet been computed, the eDiscovery module proceeds to do this as well.

The eDiscovery module 256 compares the returned hash value against the hash value of the source file. If there is a match, the files are the same, and the metadata of the matching file is collected and preserved in the evidence file associated with the investigation subject along with the investigation GUID. If the matching file is also to be acquired, the eDiscovery module 254 transmits a command to the servlet to acquire the matching file. The acquired file is then stamped with the GUID and stored in the evidence file associated with the investigation subject.

According to one embodiment of the invention, the eDiscovery module 254 takes a timestamp of the date and time in which the metadata and/or files were acquired, and stores this timestamp information with the corresponding metadata. The eDiscovery module 254 also stores information of the investigation subject applied to the investigation in the evidence file. In this manner, the files that have been preserved during the investigation may be easily and reliably associated with the investigation subject. This provides complete tracking of why each file was collected.

According to one embodiment of the invention, the eDiscovery module may optionally create a log file for each target machine listing the full path (directory structure and file name) of every file considered, whether the file was identified or rejected based on the investigation subject. Information about the date and time of when the determination was made is also included into the log file. In this way, the eDiscovery module 256 may provide a detailed accounting of all files that were or were not responsive, aiding the defensibility of a particular investigation.

According to one embodiment of the invention, the eDiscovery module 256 further allows for on-the-fly expansion of compressed container files (e.g. zip archives) in the midst of a current scan of the target machine. In this manner, the investigation subject may be applied against the individual files within the container file. Otherwise, the entire container would have to be collected, even if it contained irrelevant data, in order to avoid risking defensibility of the investigation. According to one embodiment of the invention, the eDiscovery module provides an option as to whether to preserve entire container file if it contains a responsive file, or only the particular responsive files within the container file.

According to one embodiment of the invention, the eDiscovery module 256 constantly monitors its connection to the target machines. If the connection is disrupted, then the incomplete results are destroyed and the target machine is kept marked as incomplete. When a connection can be re-established at a later time, the target machine is re-scanned from scratch. In this way, the collection for each target machine is performed in one continuous period of time, eliminating any questions about the defensibility of the individual collection having occurred over several discontinuous time ranges.

According to one embodiment of the invention, the GUID may be retrieved from the evidence file and used to reconstruct the investigation subject including the set of investigation criteria. In this manner, the eDiscovery module 254 allows for searches to be done based on subject name and/or GUID. The reconstructed investigation criteria may then be displayed on a display.

The GUID associated with each file that is collected may be automatically compared to the GUID in an examiner report to verify that the investigation criteria was consistently applied to the collected files, and to verify that indeed the correct files have been produced in court or to an opposing party.

Figure 3:
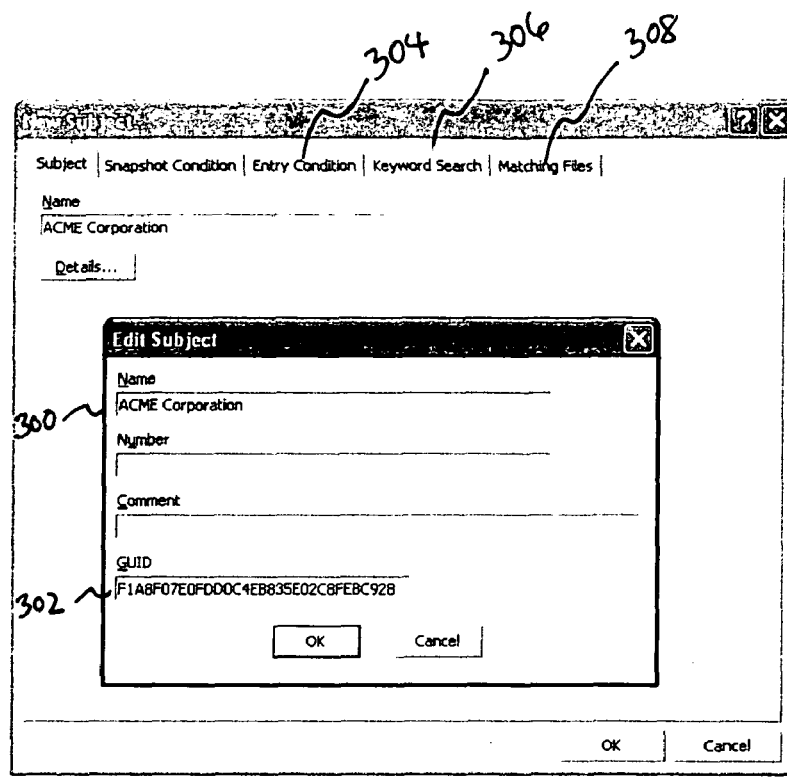
FIG. 3 is a photograph of a GUI screen for viewing details of an investigation subject according to one embodiment of the invention.

FIG. 3 is a photograph of a GUI screen for viewing details of an investigation subject according to one embodiment of the invention. The investigation subject includes a name 300 and a GUID 302. According to one embodiment of the invention, the GUID 302 is automatically generated upon an indication that a new investigation subject is to be generated, or upon edits of the investigation criteria of a previously generated investigation subject.

In order to associate different investigation criteria to the investigation subject, the examiner starts by selecting a condition tab 304 followed by a keyword search tab 306 and a matching files tab 308. The investigation criteria may also be defined in any other order as will be appreciated by a person of skill in the art.

Figure 4A:
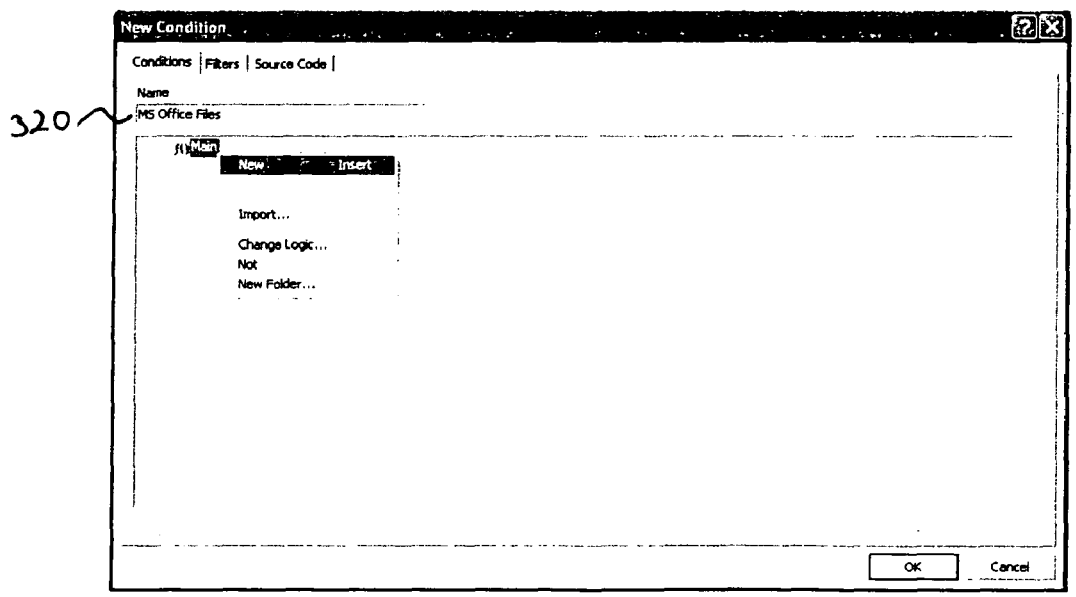
FIGS. 4A-4D are photographs of GUI screens for setting filter conditions according to one embodiment of the invention.
Figure 4B:
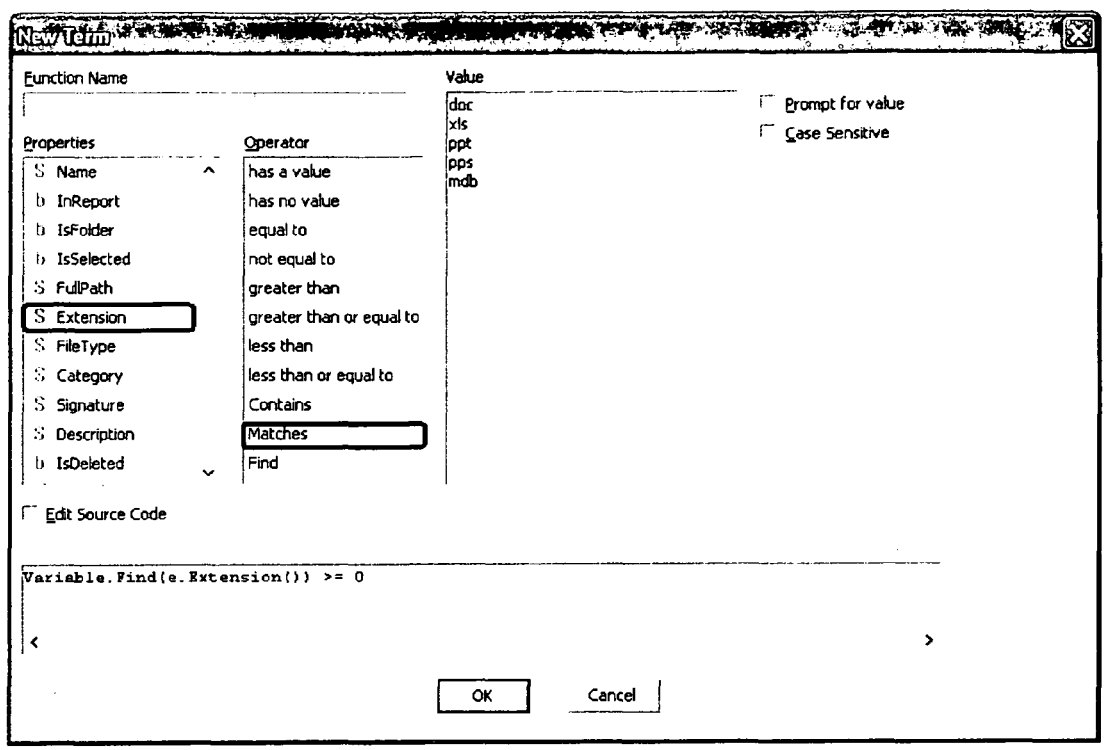
Figure 4C:
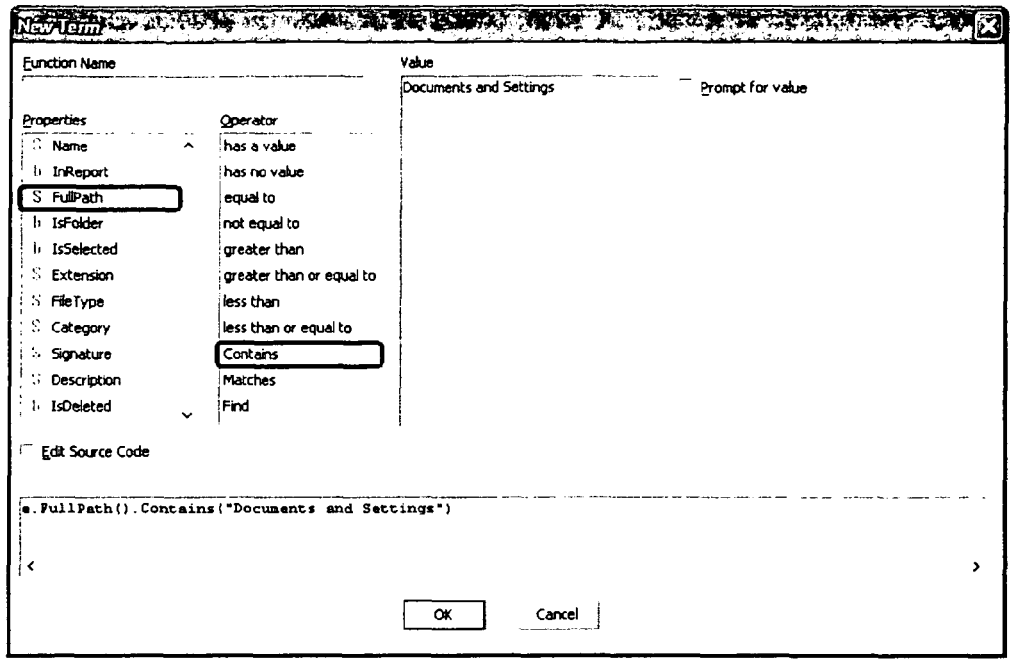

FIGS. 4A-4D are photographs of the GUI screens for setting filter conditions upon selection of the conditions tab 304 according to one embodiment of the invention. A name 320 is selected for the filter conditions that are to be defined as is illustrated in FIG. 4A. The examiner then sets various filter properties and the values of those properties as is illustrated in FIGS. 4B-4C. In FIG. 4B, a file extension property is set for filtering based on the identified file extensions. In FIG. 4C, a full path property is set for filtering based on the identified logical path of the files.

Figure 4D:
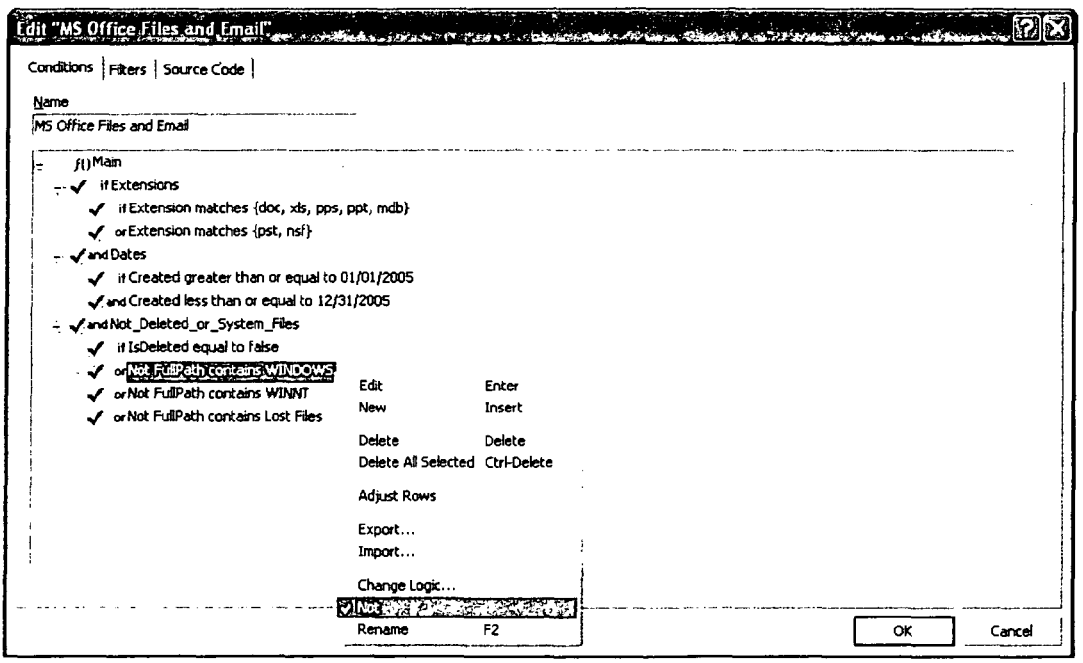

FIG. 4D illustrates the combining of various filter conditions via a boolean expression such as "and" or "or" to create a set of complex filter conditions. The illustrated filter conditions specify the following criteria:

Microsoft office files (.doc, xls, .pps, .ppt and .mdb) OR
Enterprise E-mail archives (.pst and .nsf) AND
Which were created between Jan. 1, 2005 and Dec. 31, 2005 AND
Which are NOT deleted, NOT system files in the root Windows directory or are NOT Lost Files (files recovered on the drive with no logical parent folder.

Figure 5A:
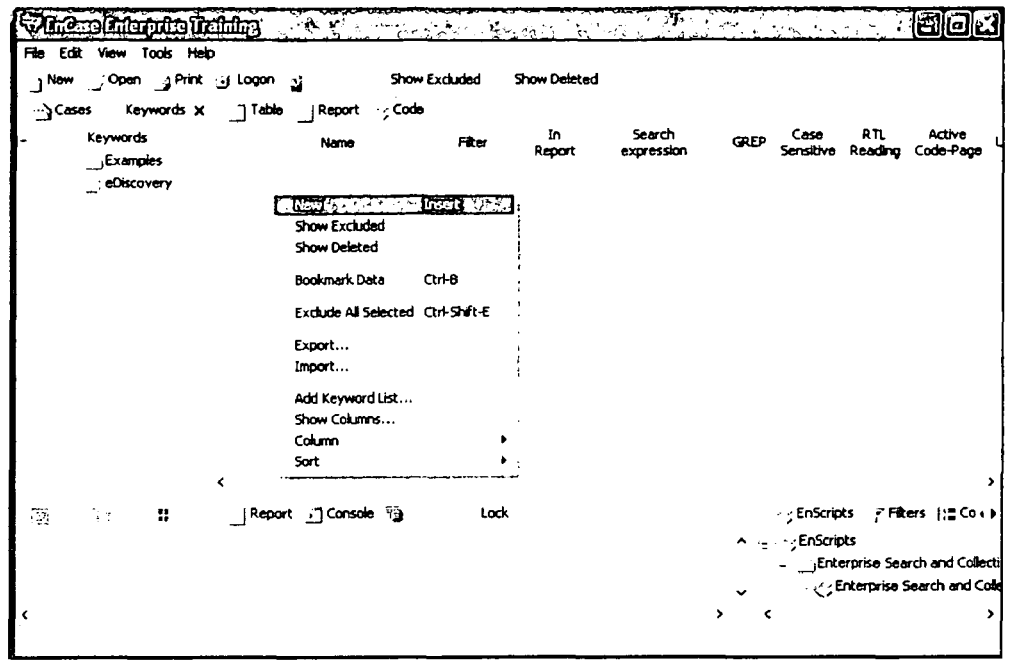
FIGS. 5A-5D are photographs of GUI screens for setting search keywords according to one embodiment of the invention.
Figure 5B:
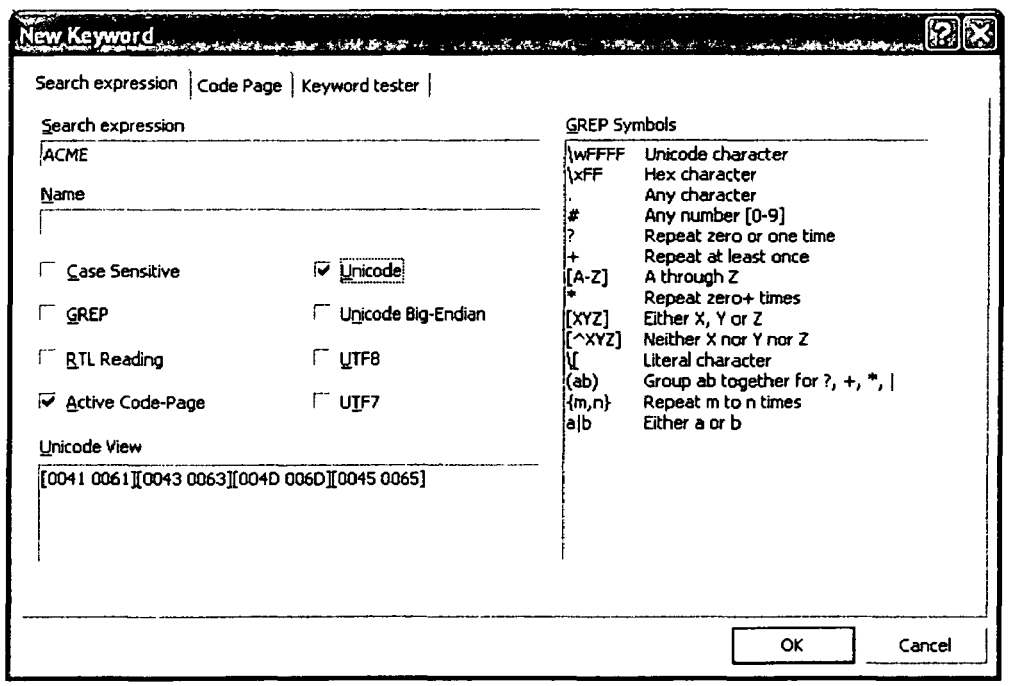

FIGS. 5A-5D are photographs of the GUI screens for setting search keywords according to one embodiment of the invention. According to one embodiment, a keyword list is initially generated and saved in a keyword file as illustrated in FIGS. 5A-5B. In the illustrated example, the keywords that are generated are saved in an "eDiscovery" file. The keyword file may then be used for different investigation subjects.

Figure 5C:
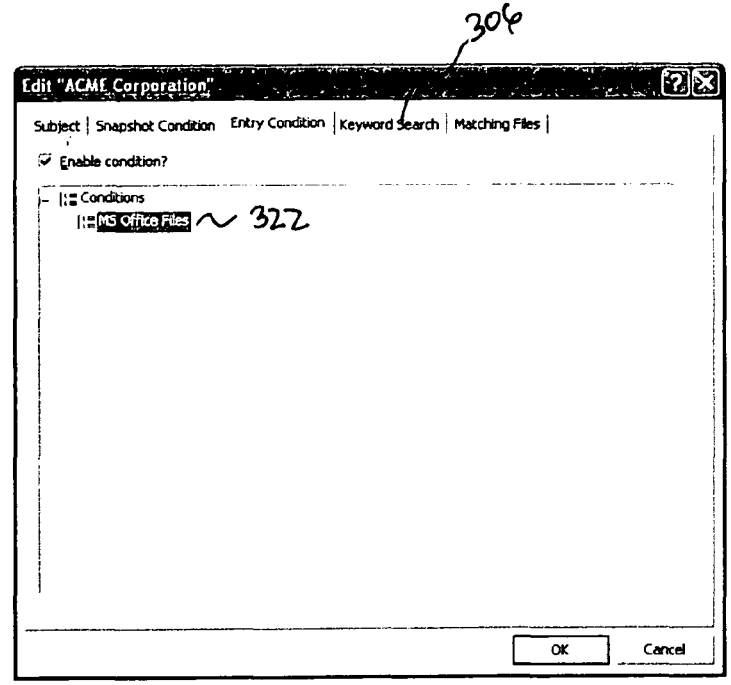
Figure 5D:
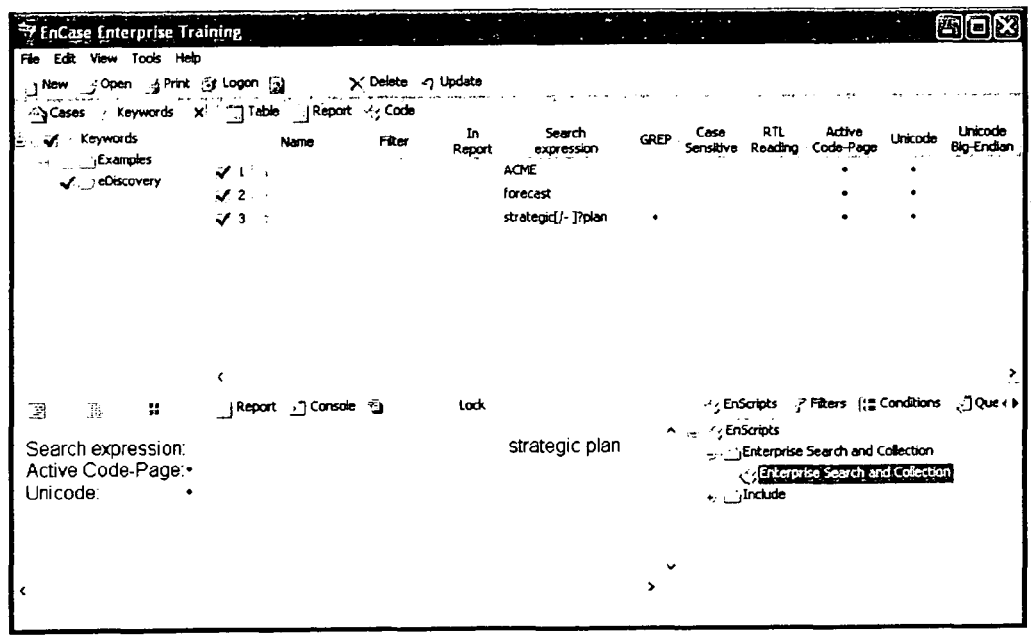

FIGS. 5C-5D illustrate the use of a generated keyword list for specifying a keyword search for a particular investigation subject. In this regard, after the filter conditions have been specified as illustrated in FIGS. 4A-4D, a name 322 assigned to the filter conditions is highlighted as is illustrated in FIG. 5C, and the keyword search tab 306 selected for selecting the appropriate keyword file.

FIG. 5D illustrates the selection of the "eDiscovery" keyword file, and the selection of particular keywords within the file for the current investigation subject.

Figure 6:
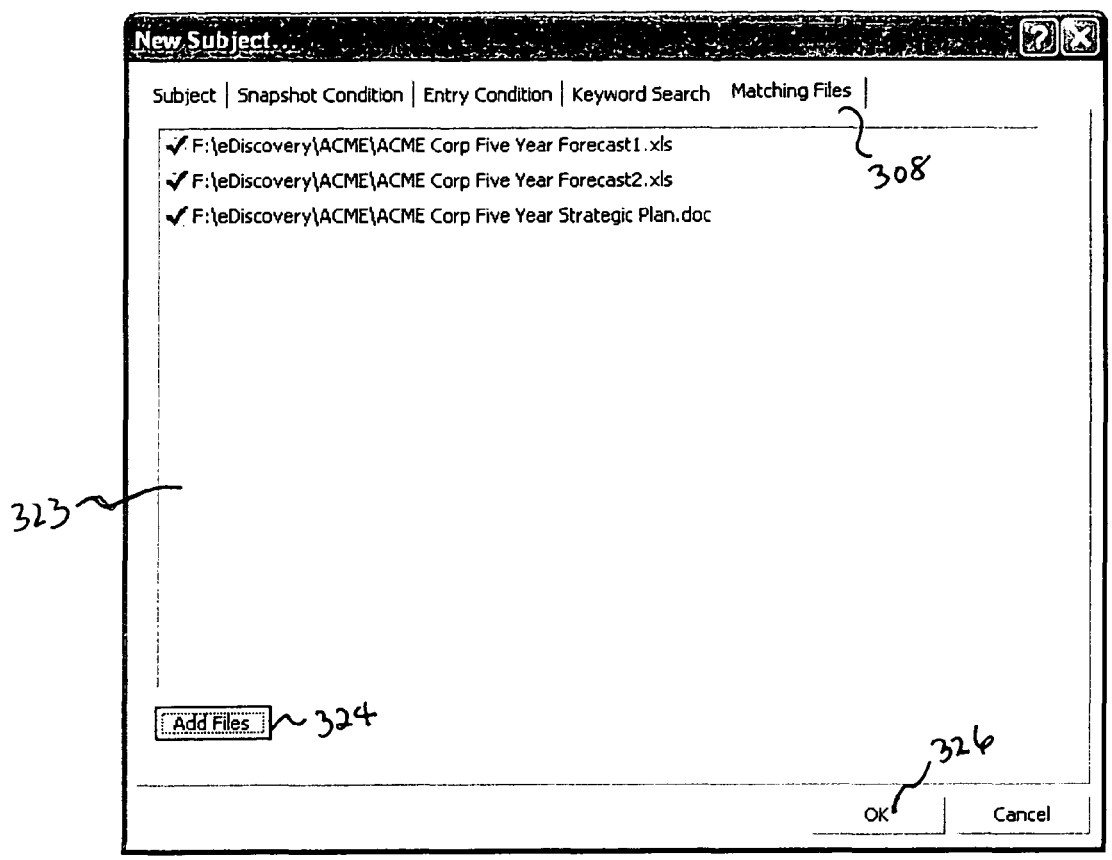
FIG. 6 is a photograph of a GUI screen for specifying source files to be searched for a match according to one embodiment of the invention.

In order to search for a match of specific source files, the matching files tab 308 is selected and an add files command 324 given as is illustrated in FIG. 6, to browse to a folder containing a list of possible source files. The files within the selected folders are then displayed in a matching files window 323. The specific files to be searched for a match are then selected, and an OK button 326 selected to save the selected source files for the particular investigation subject.

Figure 7:
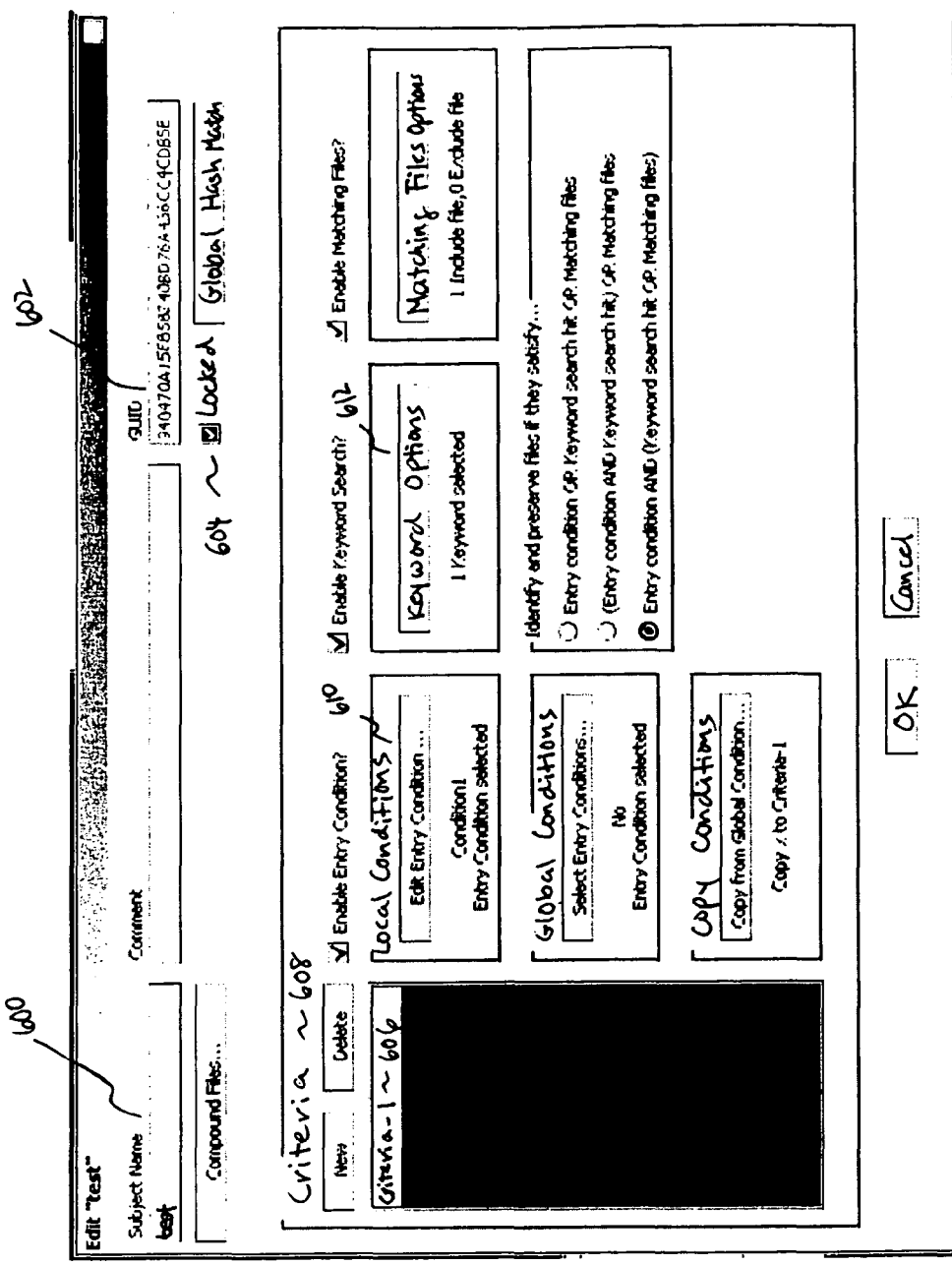
FIG. 7 is a photograph of a GUI screen for viewing and/or editing an investigation subject after it has been created according to one embodiment of the invention.

FIG. 7 is a photograph of a GUI screen for viewing and/or editing an investigation subject after it has been created according to one embodiment of the invention. The subject name assigned to the investigation subject appears in a name field 600, and the GUID assigned to the investigation subject appears in a GUID field 602. Area 604 identifies the investigation subject as being locked or unlocked. According to one embodiment of the invention, a locked state indicates that the investigation subject may not be modified. According to one embodiment of the invention, the subject is locked the first time the investigation subject is selected and a command given to run an investigation based on the subject. According to one embodiment of the invention, the subject is locked even before a connection is made to a first target computer. Thereafter looking at the subject in the GUI will display it as locked, even if the subject is transferred to another examiner computer. An unlocked state indicates that the investigation subject may be modified. According to one embodiment of the invention, if any of the investigation criteria options are modified, a new GUID is generated and associated with the investigation subject.

A criteria area 608 identifies one or more investigation criteria sets defined for the investigation subject. According to one embodiment of the invention, more than one investigation criteria set may be defined for a particular investigation subject.

A criteria name identified in a criteria name field 606 identifies each investigation criteria set. In the illustrated embodiment, a single criteria set is defined. Selection of a particular investigation criteria set in the criteria name field 606 causes display of various filter conditions 610 and keyword options 612 defined for the criteria set. In this manner the investigation criteria defined for a particular investigation subject may be reconstructed and/or verified in an reliable and easy manner.

Figure 8:
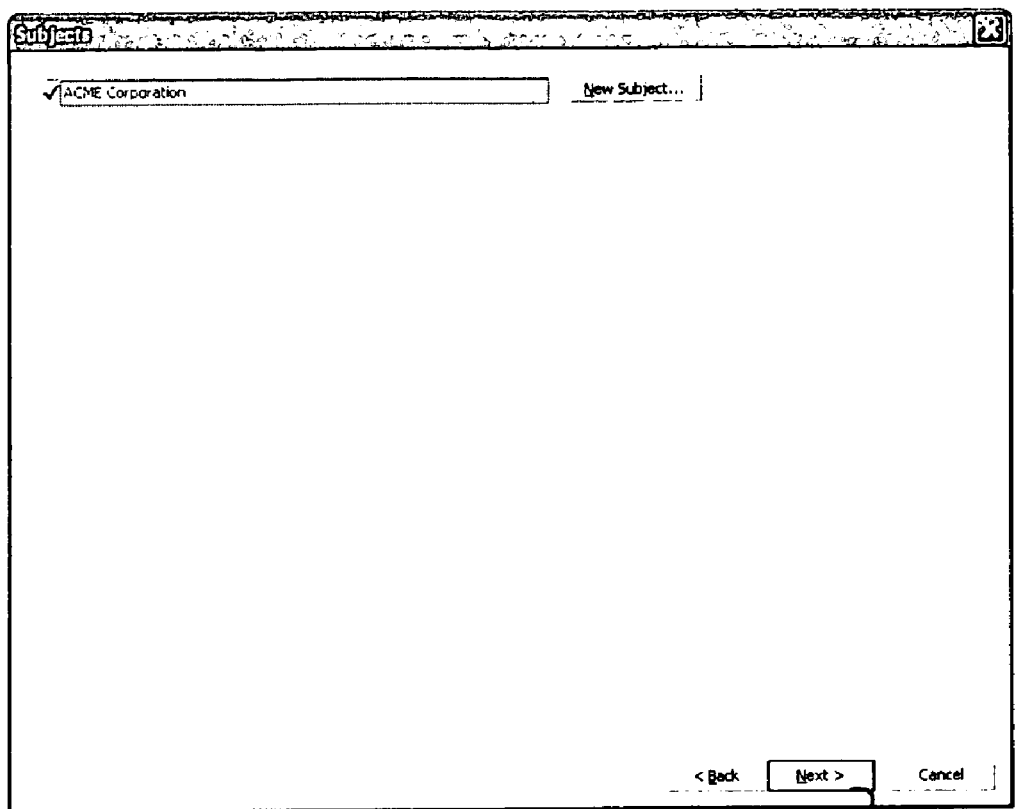
FIG. 8 is GUI screen for applying an investigation subject to an investigation of one or more target machines according to one embodiment of the invention.

FIG. 8 is GUI screen for applying an investigation subject to an investigation of one or more target machines according to one embodiment of the invention. In the illustrated example, an investigation subject with the name "ACME Corporation" is selected, and a command to initiate the investigation is provided via selection of a next button 350. Additional GUI screens (not shown) are then displayed for allowing the examiner to select the target machines to be investigated, and to connect to the secure server 111.

The results of the investigation are preserved in an evidence file referred to as a logical evidence file (LEF). According to one embodiment of the invention, the LEF is a container file for storing the metadata of the collected files as well as the content of those files. The LEF presents the metadata of the preserved files in such a manner as to allow for the recreation of how the files existed on the original device.

Included in the LEF are various files, including a metadata file for each preserved file, and files containing the content of each the preserved file. According to one embodiment of the invention, the metadata file for each preserved file is kept hidden and not presented as a contained file. The metadata is extracted by the client software 116 and presented as fields associated with the contained file to recreate the file in its original context on the target device. The LEF may also take the form of a folder or other evidence data store as will be appreciated by a person of skill in the art.

FIG. 9 is a layout diagram of metadata preserved in an LEF according to one embodiment of the invention. The metadata includes, for each file that is responsive to the investigation subject, a file name 500, file type 502, and MAC (modified, accessed, created) dates 504. The file's hash value 506, full directory structure 508, and ownership and access permission information 510 are also preserved in the LEF. In addition, the LEF further stores the investigation subject including a subject name 516, GUID 512, and the date and time 514 in which the metadata information was acquired. In this manner, the file corresponding to the preserved metadata becomes associated with the investigation subject stored in the LEF.

Figure 10:
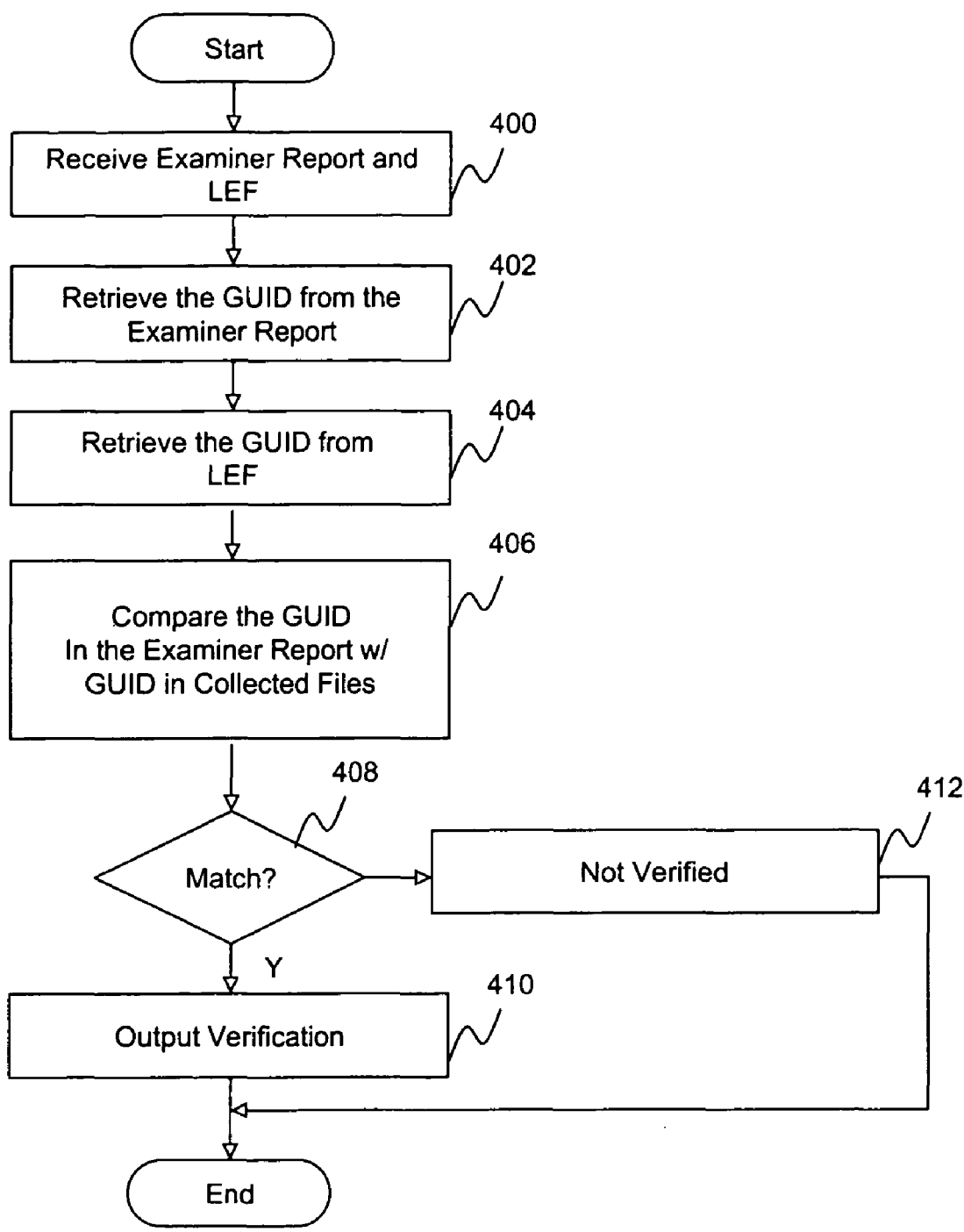
FIG. 10 is a flow diagram of a process for verifying evidence produced in response to a discovery order according to one embodiment of the invention.

FIG. 10 is a flow diagram of a process for verifying evidence produced in response to a discovery order according to one embodiment of the invention. Although the process is described as a software process implemented by a post-processing module in a third party computer, a person of skill in the art should recognize that the process may also be implemented by the eDiscovery module 254 or another module in the examining machine 115.

In step 400, the post-processing module receives an examiner report with information on the investigation that was conducted responsive to the discovery order. According to one embodiment of the invention, the examiner report includes the GUID of the investigation subject that was applied for the investigation.

The post-processing module also receives the LEF containing the metadata and the files that have been preserved as a result of the investigation.

In step 402, the post-processing module retrieves the GUID from the examiner report.

In step 404, the post-processing module retrieves the GUID from the LEF.

In step 406, the post-processing module compares the GUID in the examiner report to the GUID in the LEF.

In step 408, the post-processing module determines whether the GUIDs match. If the answer is YES, the post-processing module outputs a verification message in step 410. If the answer is NO, the post-processing module outputs, in step 412, a message that the investigation could not be verified.

According to one embodiment of the invention, the post-processing module may also recompute the hash value of the stored file contents to compare them against the stored hash value at the time of collection, in order to detect corruption in the LEF.

Figure 11A:
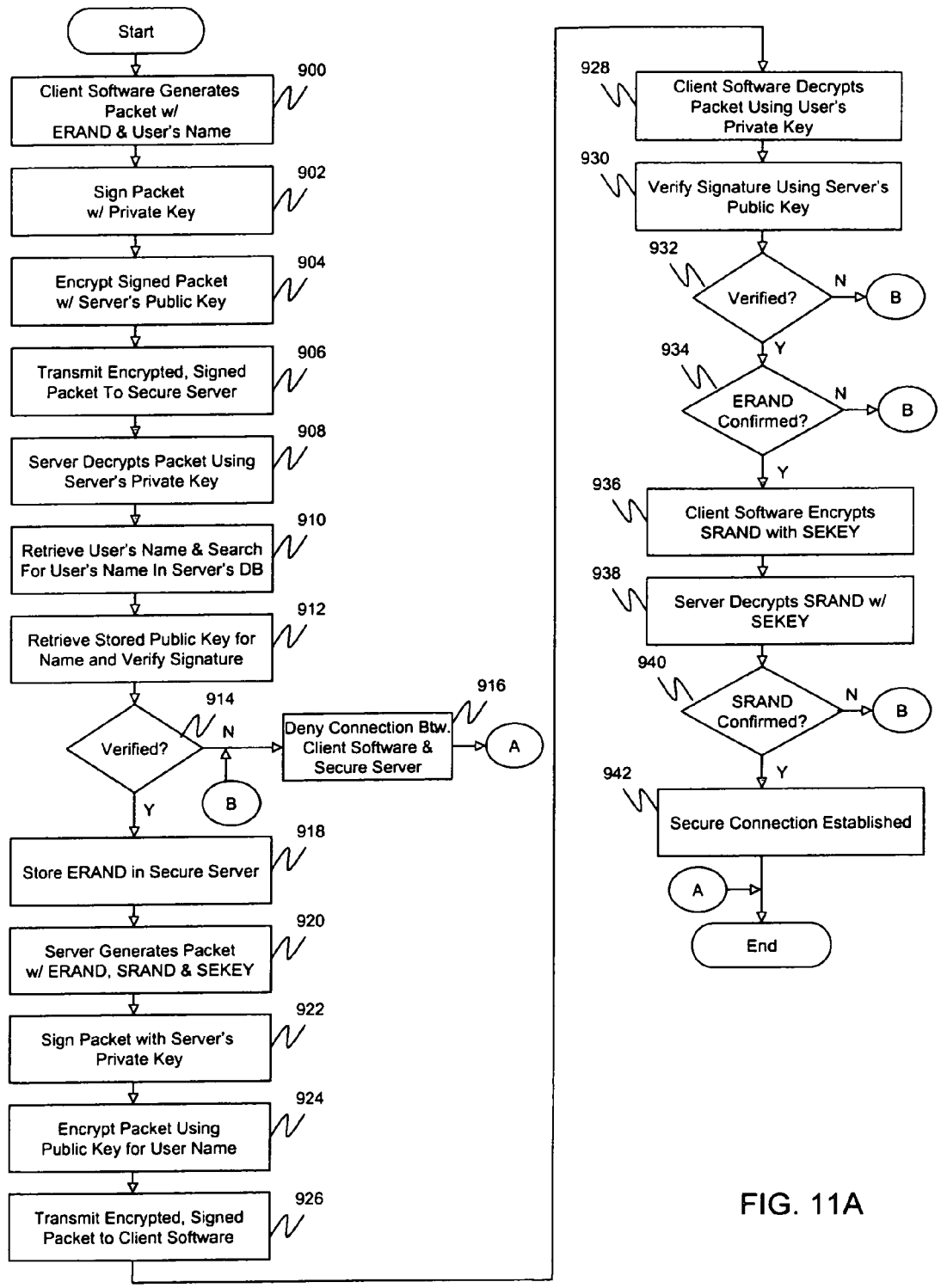
FIG. 11A is a flow diagram of a process for establishing secure communication between an examining machine and a secure server according to one embodiment of the invention.

FIG. 11A is a flow diagram of a process for establishing secure communication between the examining machine 115 and the secure server 111 according to one embodiment of the invention. The client software 116 or reconnect module 254 (hereinafter collectively referred to as the client software) resident in the examining machine 115 is invoked for establishing the secure communication. In general terms, the client software, in step 900, generates an examiner's random number "Erand" and includes it into a packet along with the examiner's user name. In step 902, the client software signs the packet with a user authentication private key as is understood by those of skill in the art. In step 904, the client software encrypts the signed packet with the secure server's public key according to conventional mechanisms, and transmits the encrypted, signed packet to the secure server 111 in step 906.

In step 908, the secure server 111 receives the packet and invokes its computer investigation software 109 to decrypt the packet using the server's private key. In step 910 the software 109 retrieves the examiner's user name from the packet and searches the server's database for a match. The matched name in the server's database includes a public user authentication key which is used in step 912 to verify the user's signature on the packet according to conventional mechanisms. If the signature is not verified, as determined in step 914, the client software cannot be authenticated and a connection between the client software and the secure server is denied in step 916.

If, however, the signature is verified, the client software may be authenticated, and the computer investigation software 109 stores the examiner's random number in step 918. In step 920, the processor generates its own server random number "Srand" and a server-to-examiner session encryption key "SEkey" to be used to encrypt future communications between the server and the examiner. These values, as well as the original examiner's random number are signed with the server's private key in step 922, encrypted with the user's public key in step 924, and transmitted to the client software in step 926.

In step 928, the client software 116 receives the packet from the secure server and decrypts it using the user's private key. In step 930, the client software verifies the server's signature with the server's public key according to conventional mechanisms. In step 932, a determination is made as to whether the signature may be verified. If the answer is YES, the server is authenticated, and the client software verifies the examiner's random number that is transmitted by the server to confirm that it is, in fact, the same number that was sent to the server. If the number may be confirmed, as is determined in step 934, the examiner creates another packet to send back to the server 111. This packet includes the server random number which is encrypted, in step 936, with the server-to-examiner session key. The encrypted packet is then transmitted to the server.

In step 938, the server's computer investigation software 109 decrypts the packet containing the server random number with the server-to-examiner session key. If the received server random number is the same number originally generated and sent to the client software as is determined in step 940, the number is confirmed, and a secure connection is established in step 942. The process for establishing a secure connection between the client software and the secure server 111 is described in more detail in the above-referenced U.S. Pat. No. 6,792,545.

Once a secure connection is established, an examiner may use its client software 116 to request investigation of the target machines across the network in support of incident response, information auditing, and forensic discovery. The secure server 111 authorizes and securely brokers requests and communications from the client software to the target machines. The communication between the server and the client software is encrypted using the server-to-examiner session encryption key.

Figure 11B:
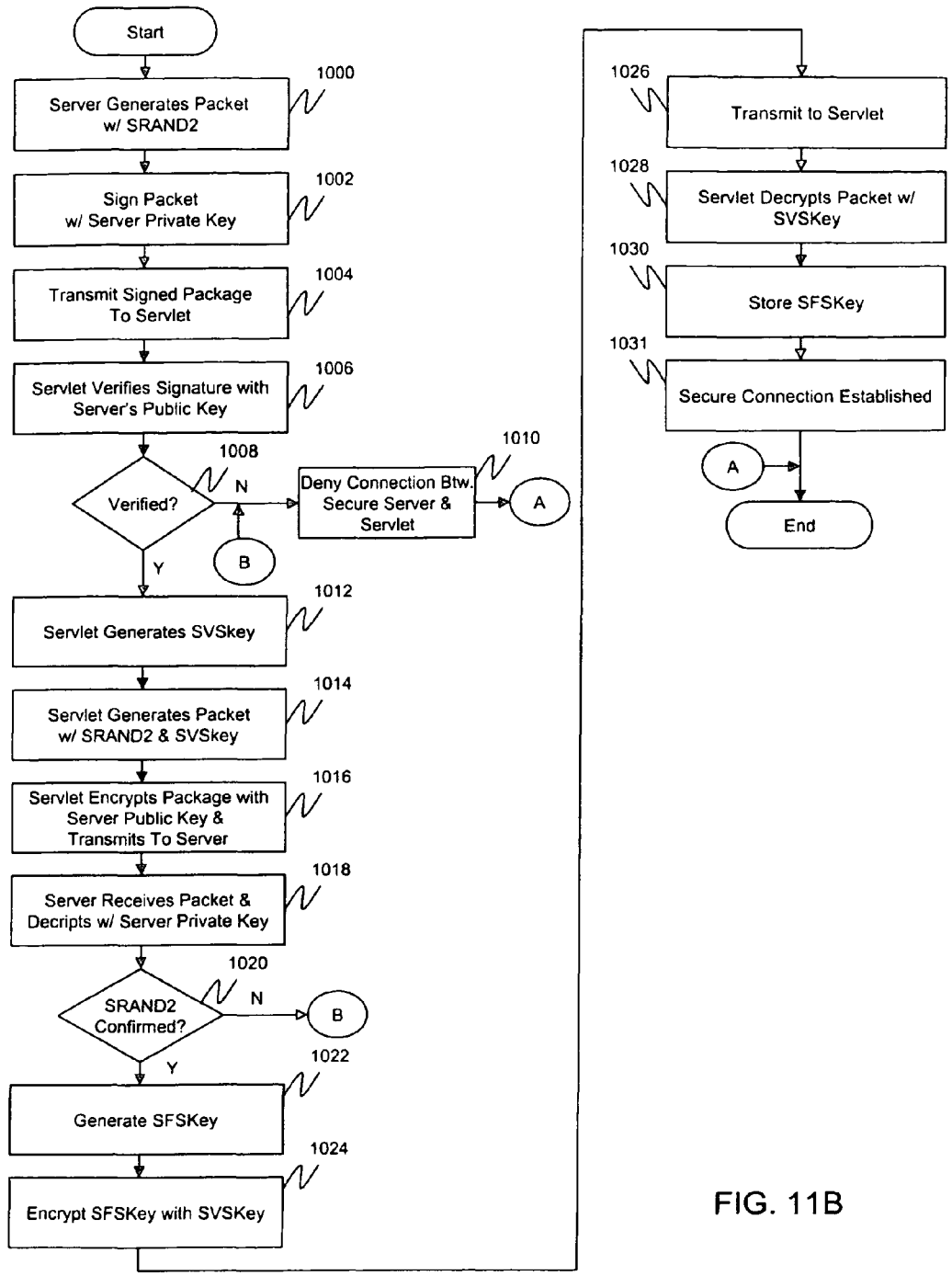
FIG. 11B is a flow diagram of a process for establishing a secure communication between a secure server and a servlet according to one embodiment of the invention.

FIG. 11B is a flow diagram of a process for establishing a secure communication between the secure server 111 and the servlet 118 according to one embodiment of the invention. A number of such secure communications may be established concurrently. The communication is established in response to request by the examining machine to investigate the target machine running the servlet.

In step 1000, the server's computer investigation software 109 generates a second server random number "Srand2," and signs the packet with the server's private key in step 1002. In step 1004, the software 109 transmits the signed packet to the servlet.

The servlet receives the packet signed with the second server random number, and in step 1006, verifies the signature with the server's public key. If the signature cannot be verified, as is determined in step 1008, a safe connection between the secure server 111 and the servlet 118 is denied in step 1010.

If, however, the server's signature is verified, the servlet generates a servlet-to-server session encryption key in step 1012 and inserts it into a packet in step 1014 along with the second server random number. The servlet encrypts the packet in step 1016 with the server's public key, and transmits the packet to the server 111.

In step 1018, the server's computer investigation software 109 receives the encrypted packet and decrypts it with the server's private key. The processor further confirms in step 1020, whether the second server random number is the same number that was originally sent to the servlet. If the answer is YES, the processor generates a server-to-servlet session encryption key in step 1022, and encrypts the server-to-servlet session encryption key with the servlet-to-server session encryption key in step 1024. In step 1026, the encrypted packet is transmitted to the servlet.

In step 1028, the servlet decrypts the packet with the servlet-to-server session key, and stores the server-to-servlet session key in step 1030. In step 1031, a secure connection is established, and all subsequent data exchanges between the server and the servlet are encrypted using the server-to-servlet session key. The establishment of a secure connection between the secure server 111 and the servlet 118 is described in more detail in the above-referenced U.S. Pat. No. 6,792,545.

Once the server 111 has successfully established secure connections with the examining machine 115 and one or more servlets, the examining machine 115 and the servlets may communicate directly in effectuating searches of dynamic and/or static data stored in the target devices.

Although this invention has been described in certain specific embodiments, those skilled in the art will have no difficulty devising variations to the described embodiment which in no way depart from the scope and spirit of the present invention. Furthermore, to those skilled in the various arts, the invention itself herein will suggest solutions to other tasks and adaptations for other applications. It is the Applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A computer-implemented method for conducting investigations of one or more target devices in a data communications network, the method comprising:

defining, under control of a computer, one or more filter conditions for culling one or more files stored in the one or more target devices;

grouping the one or more filter conditions into a single investigation subject;

automatically generating, under control of the computer, at least one global unique identifier uniquely identifying the investigation subject;

locking the investigation subject and the at least one global unique identifier for preventing modification of the filter conditions and the global unique identifier;

storing in memory the locked investigation subject and the locked global unique identifier, in association with each other;

generating an evidence container file on an examining machine;

applying by the examining machine the locked investigation subject to a plurality of files stored in the one or more target devices during an investigation session;

receiving from the one or more target devices at least metadata of one or more of the plurality of files matching the plurality of filter conditions of the applied investigation subject, wherein the matching files is only a subset of the plurality of files stored in the one or more target devices and the one or more target devices transmit at least the metadata for only the matching files storing in the evidence container file at least the received metadata of the matching files without modification to the received metadata due to the storing;

storing by the examining machine in the evidence container file or attaching to one or more of the matching files in the evidence container file, the locked global unique identifier, wherein the locked global unique identifier associates the matching files to the applied investigation subject thereby evidencing that the matching files resulted from the investigation session that applied the investigation subject.

2. The method of claim 1 further comprising:

regenerating the global unique identifier in response to a user command to modify the one or more filter conditions; and storing the regenerated global unique identifier in association with the investigation subject.

3. The method of claim 1, wherein at least one of the one or more filter conditions specify file metadata, the method further comprising:

retrieving filesystem data of the one or more target devices;

comparing the filesystem data with the specified file metadata; and identifying the one or more of the plurality of files based on the comparison.

4. The method of claim 1, wherein at least one of the one or more filter conditions includes one or more keywords for identifying files in the one or more target devices containing the one or more keywords.

5. The method of claim 1, wherein at least one of the one or more filter conditions identifies a specific source file for identifying a file in the one or more target devices matching the source file.

6. The method of claim 5 further comprising:

identifying lengths of the source file and a file in a particular target machine that is being considered for a match;

determining whether the lengths are equal;

if the lengths are equal, invoking the target machine to compute a digital signature value of the file being considered for a match;

retrieving the digital signature values of the source file and the file being considered for a match;

determining whether the digital signature values are equal; and if the digital signature values are equal, identifying the file being considered for a match as a matching file.

7. The method of claim 1 further comprising:
storing the global unique identifier in an examiner report;
receiving the examiner report including the global unique identifier;
retrieving the global unique identifier from the evidence container file;
comparing the global unique identifier in the examiner report with the global unique identifier in the evidence container file; and
outputting a verification message upon a match of the global unique identifiers.

8. The method of claim 1 further comprising:
retrieving by a computer device the stored global unique identifier from the evidence container file;
searching by the computer device for an investigation subject matching the global unique identifier;
reconstructing the one or more filter conditions in the investigation subject identified from the searching; and
displaying on a display coupled to the computer device, the reconstructed plurality of filter conditions as the filter conditions applied for obtaining at least the metadata stored in the evidence container file.

9. A system for conducting investigations of one or more target devices in a data communications network, the system comprising:
one or more processors; and
one or more memory devices operably coupled to the one or more processors storing program instructions therein, each of the one or more processors being operable to execute one or more of the program instructions, the program instructions including:
defining one or more filter conditions for culling one or more files stored in the one or more target devices;
grouping the one or more filter conditions into a single investigation subject;
automatically generating at least one global unique identifier uniquely identifying the investigation subject;
locking the investigation subject and the at least one global unique identifier for preventing modification of the filter conditions and the global unique identifier;
storing the locked investigation subject and the locked global unique identifier, in association with each other, in the one or more memory devices;
generating an evidence container file on the one or more memory devices;
applying the locked investigation subject to a plurality of files stored in the one or more target devices during an investigation session;
receiving from the one or more target devices at least metadata of one or more of the plurality of files matching the plurality of filter conditions of the applied investigation subject, wherein the matching files is only a subset of the plurality of files stored in the one or more target devices and the one or more target devices transmit at least the metadata for only the matching files;
storing in the evidence container file at least the received metadata of the matching files without modification to the received metadata due to the storing;
storing in the evidence container file or attaching to one or more of the matching files in the evidence container file, the locked global unique identifier, wherein the locked global unique identifier associates the matching files to the applied investigation subject thereby evidencing that the matching files resulted from the investigation session that applied the investigation subject.

10. The system of claim 9, wherein the program instructions further include:
regenerating the global unique identifier in response to a user command to modify the one or more filter conditions; and
storing the regenerated global unique identifier in association with the investigation subject.

11. The system of claim 9, wherein at least one of the one or more filter conditions specify file metadata, the program instructions further including:
retrieving filesystem data of the one or more target devices;
comparing the filesystem data with the specified file metadata; and
identifying the one or more of the plurality of files based on the comparison.

12. The system of claim 9, wherein at least one of the one or more filter conditions includes one or more keywords for identifying files in the one or more target devices containing the one or more keywords.

13. The system of claim 9, wherein at least one of the one or more filter conditions identifies a specific source file for identifying a file in the one or more target devices matching the source file.

14. The system of claim 13, wherein the program instructions further include:
identifying lengths of the source file and a file in a particular target machine that is being considered for a match;
determining whether the lengths are equal;
if the lengths are equal, invoking the target machine to compute a digital signature value of the file being considered for a match;
retrieving the digital signature values of the source file and the file being considered for a match;
determining whether the digital signature values are equal; and
if the digital signature values are equal, identifying the file being considered for a match as a matching file.

15. The system of claim 9, wherein the-program instructions further include:
storing the global unique identifier in an examiner report;
receiving the examiner report including the global unique identifier;
retrieving the global unique identifier from the evidence container file;
comparing the global unique identifier in the examiner report with the global unique identifier in the evidence container file; and
outputting a verification message upon a match of the global unique identifiers.

16. The system of claim 9 further comprising a computer device configured to:
retrieve the stored global unique identifier from the evidence container file;
search for an investigation subject matching the global unique identifier;
reconstruct the one or more filter conditions in the investigation subject identified from the searching; and
display on a display the reconstructed plurality of filter conditions as the filter conditions applied for obtaining the one or more files in the evidence container file.

17. The method of claim 1 further comprising:
establishing a data communications link with the one or more target devices; and copying the matching files from the one or more target devices in one continuous period of time.

18. The method of claim 17, wherein the copying of the matching files in one continuous period of time includes:
    detecting disruption of the data communications link; and
    re-scanning the one or more target devices from the start position in response to a resuming of the data communications link.

19. The method of claim 1 further comprising:
    storing in the evidence container file a hash value of at least one of the matching files which content is stored in the evidence container file;
    re-computing the hash value of the at least one of the matching files; and
    comparing the stored hash value against the re-computed hash value for detecting corruption of the evidence container file.

20. The method of claim 1 further comprising:
    extracting preserved full file directory structure of the matching files for recreating, by the examining machine, the matching files as existing in the one or more target machines devices.

21. The method of claim 1, wherein the global unique identifier is separate from a plurality of encryption keys for encrypting communication to and from the examining machine.

22. The method of claim 1, wherein contents of the matching files are stored in the evidence container file without making a disk image of one or more hard disks of the one or more target devices storing the matching files.

23. The method of claim 1, wherein the metadata includes timestamps, the method further comprising:
    preserving, without modification, timestamps of when each of the matching files was modified, accessed, and created; and
    writing into the evidence container file the preserved timestamps of each of the matching files.

24. The method of claim 1, wherein the locked investigation subject is concurrently applied to a plurality of target devices over the data communications network.

25. The method of claim 24 further comprising:
    maintaining in a database status of the investigation for each of the plurality of target devices.

26. The method of claim 1, wherein the received metadata is stored in a body of the evidence container file as text data.

27. The method of claim 1, wherein the one or more target machines conduct a non-indexed search of the plurality of files for a key word specified as one of the filter conditions.

28. The method of claim 1 further comprising:
    maintaining in a database one or more log files for the one or more target machines; and
    storing in the one or more log files information of each of the plurality of files considered by the one or more target machines for a match against the one or more filter conditions.

* * * * *